US011885473B2

(12) United States Patent
Kim et al.

(10) Patent No.: US 11,885,473 B2
(45) Date of Patent: Jan. 30, 2024

(54) VEHICLE LAMP HAVING A LIGHT SOURCE UNIT WITH CHIP LATERALLY SPACED FROM OPTICAL AXIS OF OPTICAL UNIT AND A REFLECTOR CENTRAL AXIS TILTED WITH RESPECT TO THE OPTICAL AXIS

(71) Applicant: SL Corporation, Daegu (KR)

(72) Inventors: Dae Gon Kim, Gyeongsan-si (KR); Hyung Ho Ko, Gyeongsan-si (KR); Dong Hyun Kim, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/086,765

(22) Filed: Dec. 22, 2022

(65) Prior Publication Data

US 2023/0204180 A1 Jun. 29, 2023

(30) Foreign Application Priority Data

Dec. 27, 2021 (KR) ........................ 10-2021-0187956

(51) Int. Cl.

| | |
|---|---|
| ***F21S 41/657*** | (2018.01) |
| ***F21S 41/39*** | (2018.01) |
| ***F21S 41/36*** | (2018.01) |
| ***F21S 41/19*** | (2018.01) |
| ***F21S 41/33*** | (2018.01) |
| ***F21S 41/275*** | (2018.01) |

(52) U.S. Cl.

CPC ........... *F21S 41/657* (2018.01); *F21S 41/192* (2018.01); *F21S 41/275* (2018.01); *F21S 41/33* (2018.01); *F21S 41/36* (2018.01); *F21S 41/39* (2018.01)

(58) Field of Classification Search

CPC .............. F21Y 2115/00; F21Y 2115/10; F21Y 2115/15; F21Y 2115/20; F21Y 2115/30; F21V 13/04; F21S 41/148; F21S 41/275

See application file for complete search history.

(56) References Cited

U.S. PATENT DOCUMENTS 7,824,086 B2 * 11/2010 Yamamura ............ F21S 41/663 362/519
10,330,285 B2 * 6/2019 Son ....................... F21S 41/148
2013/0188380 A1 * 7/2013 Sekiguchi .............. F21V 13/12 362/516

* cited by examiner

*Primary Examiner* — Robert J May
(74) *Attorney, Agent, or Firm* — United One Law Group LLC; Kongsik Kim; Jhongwoo Peck

(57) ABSTRACT

A lamp module includes a light source unit that generates light, an optical unit that forms a predetermined beam pattern by transmitting the light generated by the light source unit therethrough, and a reflection unit that reflects the light generated by the light source unit to be incident upon the optical unit. In particular, the light source unit includes a light source chip, which is spaced apart laterally from an optical axis of the optical unit, and the light source chip is disposed to allow a central line that passes through middle of both sides of a light-emitting surface formed by at least one light source to be tilted with respect to the optical axis of the optical unit by an angle that is different from an angle that a central axis of the reflection unit forms with respect to the optical axis of the optical unit.

16 Claims, 11 Drawing Sheets

VEHICLE LAMP HAVING A LIGHT SOURCE UNIT WITH CHIP LATERALLY SPACED FROM OPTICAL AXIS OF OPTICAL UNIT AND A REFLECTOR CENTRAL AXIS TILTED WITH RESPECT TO THE OPTICAL AXIS

CROSS-REFERENCE TO RELATED APPLICATION

This application claims priority from Korean Patent Application No. 10-2021-0187956 filed on Dec. 27, 2021, which is herein incorporated by reference in its entirety.

BACKGROUND

1. Technical Field

The present disclosure relates to a lamp module and a vehicle lamp including the same, and more particularly, to a lamp module that can create a unified appearance as a whole and a vehicle lamp including the lamp module.

2. Description of the Related Art

In general, a vehicle includes various types of lamps that perform an illumination function for easily verifying an object positioned around the vehicle when the vehicle is being operated in low light conditions (e.g., at night) and a signaling function for notifying a driving state of the vehicle to other vehicles or road users.

For example, a head lamp and a fog lamp are primarily for the illumination function, and a turn signal lamp, a tail lamp, a brake lamp, a side marker, and the like are primarily for the signaling function. Installation criteria and specifications of the vehicular lamps are regulated by the law or regulations so that the vehicular lamps sufficiently perform the functions.

Meanwhile, in recent years, not only the functional aspects of the vehicular lamps, such as the basic role of helping safe driving by enabling drivers' visibility, but also the aesthetic aspects of the vehicular lamps that appeal to consumers through design improvement have become of great influence on consumers' decision to purchase vehicles.

To this end, some vehicular lamps are provided with a plurality of lamp modules to have a slim shape while being able to form an optimal beam pattern. When a vehicular lamp includes a plurality of lamp modules, different beam patterns are configured to be formed by the lamp modules. However, as lamp modules forming different beam patterns are required to have different light irradiation directions, it is often difficult to create a unified appearance amongst the multiple lamp modules.

Thus, a means to allow a plurality of lamp modules to create a unified appearance together while forming different beam patterns is needed.

SUMMARY

Aspects of the present disclosure provide a lamp module and a vehicular lamp including the same, which can maintain the appearance of lamp modules, even when forming different beam patterns, and can thus provide a unified appearance as a whole, even in a case where a plurality of lamp modules to form different beam patterns are used.

However, aspects of the present disclosure are not limited to those set forth herein. The above and other aspects of the present disclosure will become more apparent to one of ordinary skill in the art to which the present disclosure pertains by referencing the detailed description of the present disclosure given below.

According to an aspect of the present disclosure, a lamp module may include a light source unit that generates light; an optical unit that forms a predetermined beam pattern by transmitting the light generated by the light source unit therethrough; and a reflection unit that reflects the light generated by the light source unit to be incident upon the optical unit. In particular, the light source unit may include a light source chip, which is spaced apart laterally from an optical axis of the optical unit, and the light source chip may be disposed to allow a central line that passes through the middle of both sides of a light-emitting surface formed by at least one light source to be tilted with respect to the optical axis of the optical unit by an angle that is different from an angle that a central axis of the reflection unit forms with respect to the optical axis of the optical unit.

The central axis of the reflection unit may be tilted at a predetermined angle with respect to the optical axis of the optical unit to allow the light generated by the light source chip to proceed toward the optical unit.

The reflection unit may include a first reflective surface, which is curved, and a second reflective surface, which is formed at a front end of the first reflective surface, and a knurled structure may be formed on at least part of an inner side of the second reflective surface that is reached by the light generated by the light source unit.

A light-incident surface of the optical unit may be formed in a concave shape. A light-emitting surface of the optical unit may be formed in a convex shape and may have a greater curvature than a light-incident surface of the optical unit.

At least one optical pattern may be formed on at least parts of lateral surfaces that are formed between a light-incident surface and a light-emitting surface of the optical unit, for diffusing or scattering the light. In some embodiments, a plurality of optical patterns may be formed at regular intervals, along a diagonal direction having a predetermined angle with respect to the optical axis of the optical unit.

Further, a holder may be coupled to a heat dissipation unit on which the light source unit is disposed, to fix a position of the optical unit, and the holder may include an opening, which exposes a light-emitting surface of the optical unit and lateral surfaces of the optical unit, the lateral surfaces being formed between a light-incident surface and the light-emitting surface of the optical unit.

According to a related aspect of the present disclosure, a vehicle lamp to form at least one beam pattern may include a plurality of lamp modules. In particular, at least one of the plurality of lamp modules may include a light source unit that generates light, an optical unit that transmits the light generated by the light source unit therethrough, and a reflection unit that reflects the light generated by the light source unit to be incident upon the optical unit. The light source unit may include a light source chip, which is spaced apart laterally from an optical axis of the optical unit, and a central axis of the reflection unit may be tilted at a predetermined angle with respect to the optical axis of the optical unit to allow the light generated by the light source chip to proceed toward the optical unit.

Optical axes of optical units included in the plurality of lamp modules may be parallel to one another.

In some embodiments, at least one of the plurality of lamp modules may differ from at least one other of the plurality of lamp modules in terms of a distance by which the light source chip is spaced apart from the optical axis of the optical unit. In some embodiments, at least one of the plurality of lamp modules may differ from at least one other of the plurality of lamp modules in terms of an angle at which the central axis of the reflection unit is tilted with respect to the optical axis of the optical unit.

In some embodiments, a central line that passes through a center between both sides of a light-emitting surface of the light source chip in at least one of the plurality of lamp modules may be tilted at a different angle with respect to the optical axis of the optical unit from a central line that passes through a center between both sides of a light emitting surface of the light source chip in at least one other of the plurality of lamp modules.

In some embodiments, the optical unit may include a light-incident surface, upon which the light reflected by the reflection unit is incident, and a light-emitting surface, which emits the light incident upon the light-incident surface, and at least one of the plurality of lamp modules may differ from at least one other of the plurality of lamp modules in terms of a curvature of at least one of the light-incident surface or the light-emitting surface.

The plurality of lamp modules may further include a holder coupled to a heat dissipation unit on which the light source unit is disposed, to fix a position of the optical unit. The holder may include an opening In at least one of the plurality of lamp modules, the opening may be formed to expose a light-emitting surface of the optical unit and lateral surfaces that are formed between a light-incident surface and the light-emitting surface of the optical unit. In at least one other of the plurality of lamp modules, the opening may expose the light-emitting surface of the optical unit and the holder may cover the lateral surfaces of the optical unit.

According to the aforementioned and other embodiments of the present disclosure, the location of each beam pattern can be changed by adjusting the positions of a light source unit and a reflection unit without the need to change the optical axis of the optical unit based on each beam pattern. Also, even in a case where a plurality of lamp modules are used to form different beam patterns, the lamp modules can create a more unified appearance between them. It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
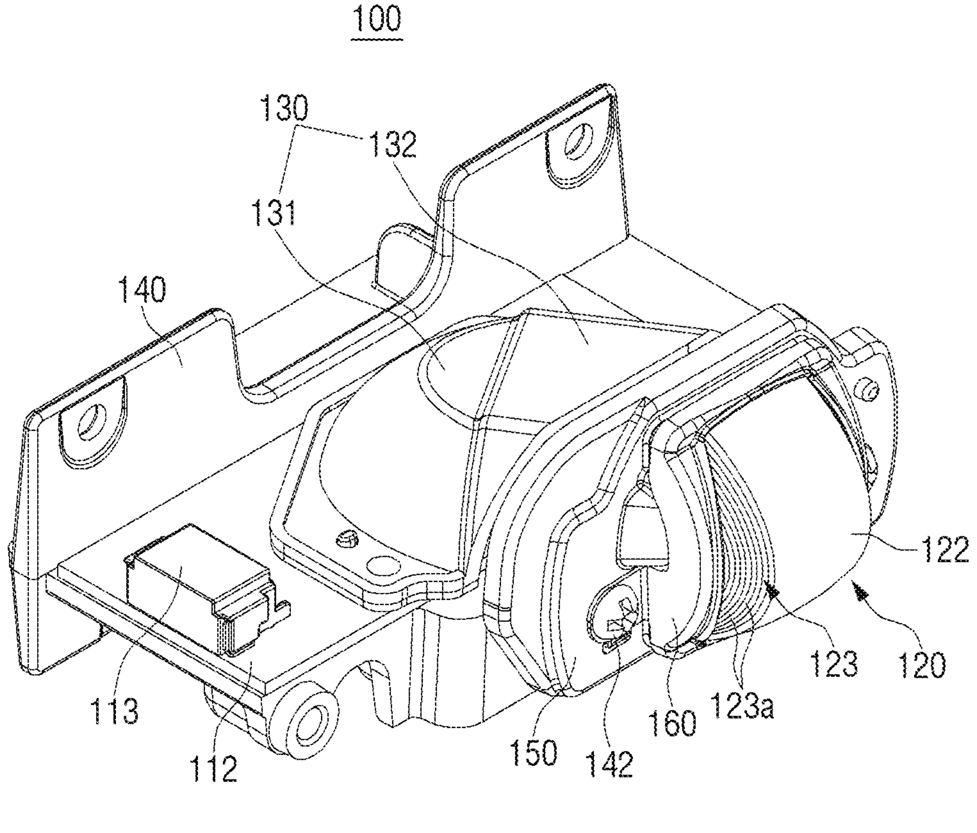
FIG. 1 is a perspective view of a lamp module according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures, and techniques will not be described in detail to avoid obscuring the disclosure.

The terminology used herein is for the purpose of describing particular exemplary embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

Embodiments of the invention are described herein with reference to plan and cross-section illustrations that are schematic illustrations of exemplary embodiments of the invention. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for describing a lamp module and a vehicular lamp according to embodiments of the present disclosure.

Figure 2:
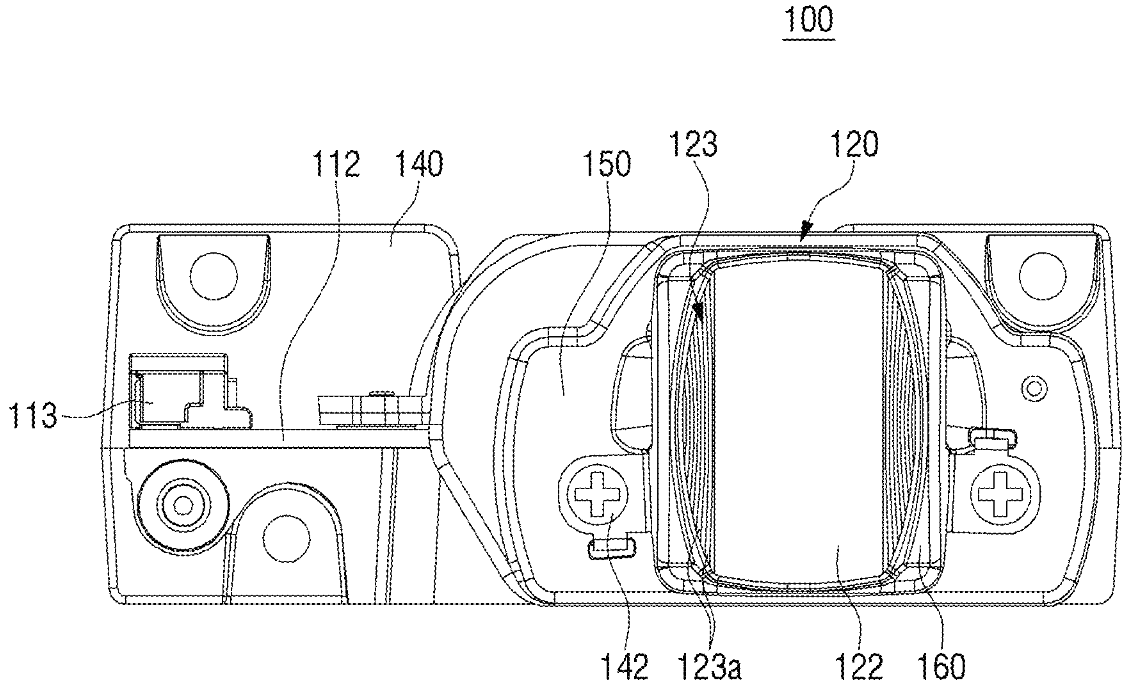
FIG. 2 is a front view of the lamp module according to an embodiment of the present disclosure.
Figure 3:
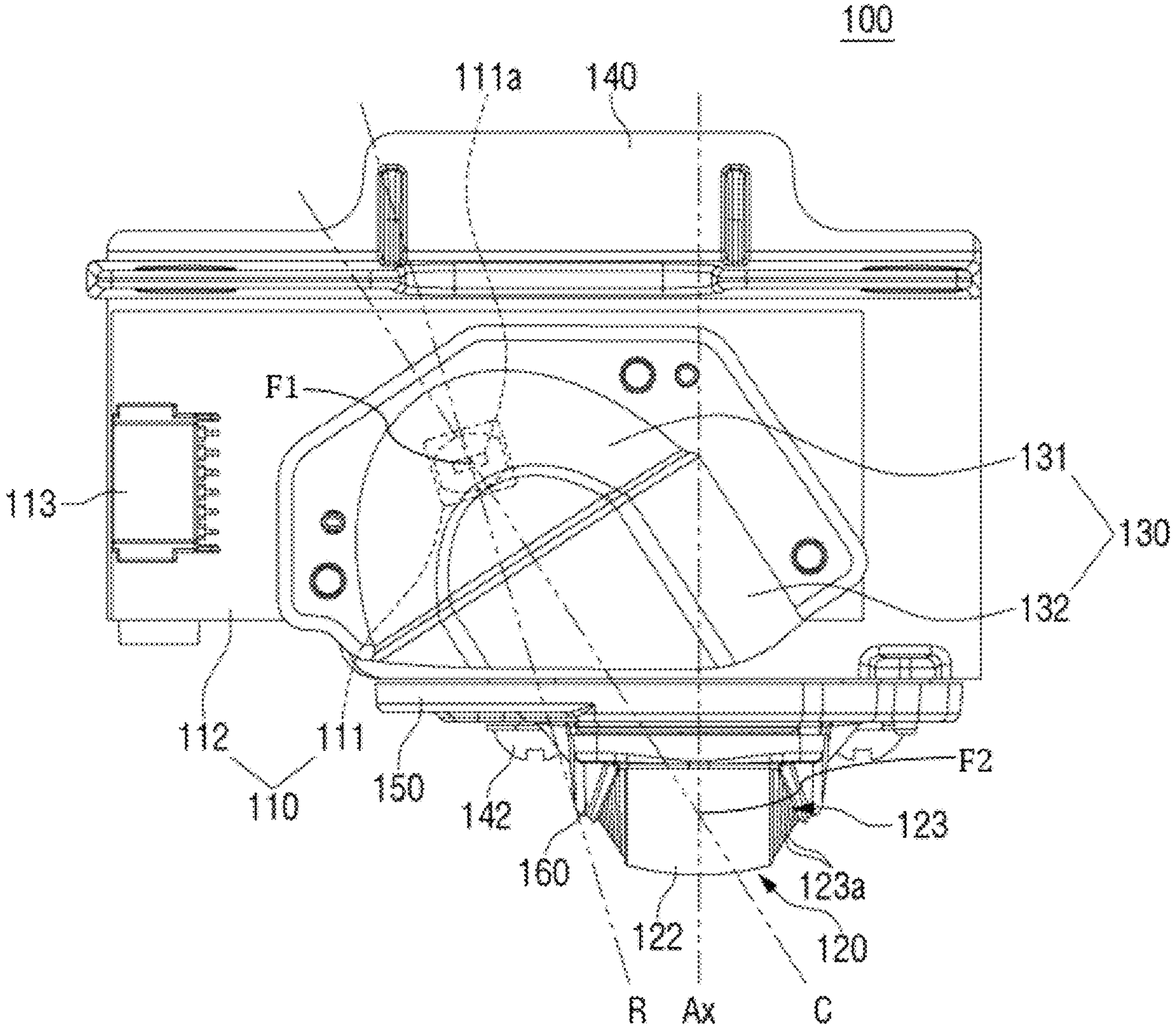
FIG. 3 is a plan view of the lamp module according to an embodiment of the present disclosure.
Figure 4:
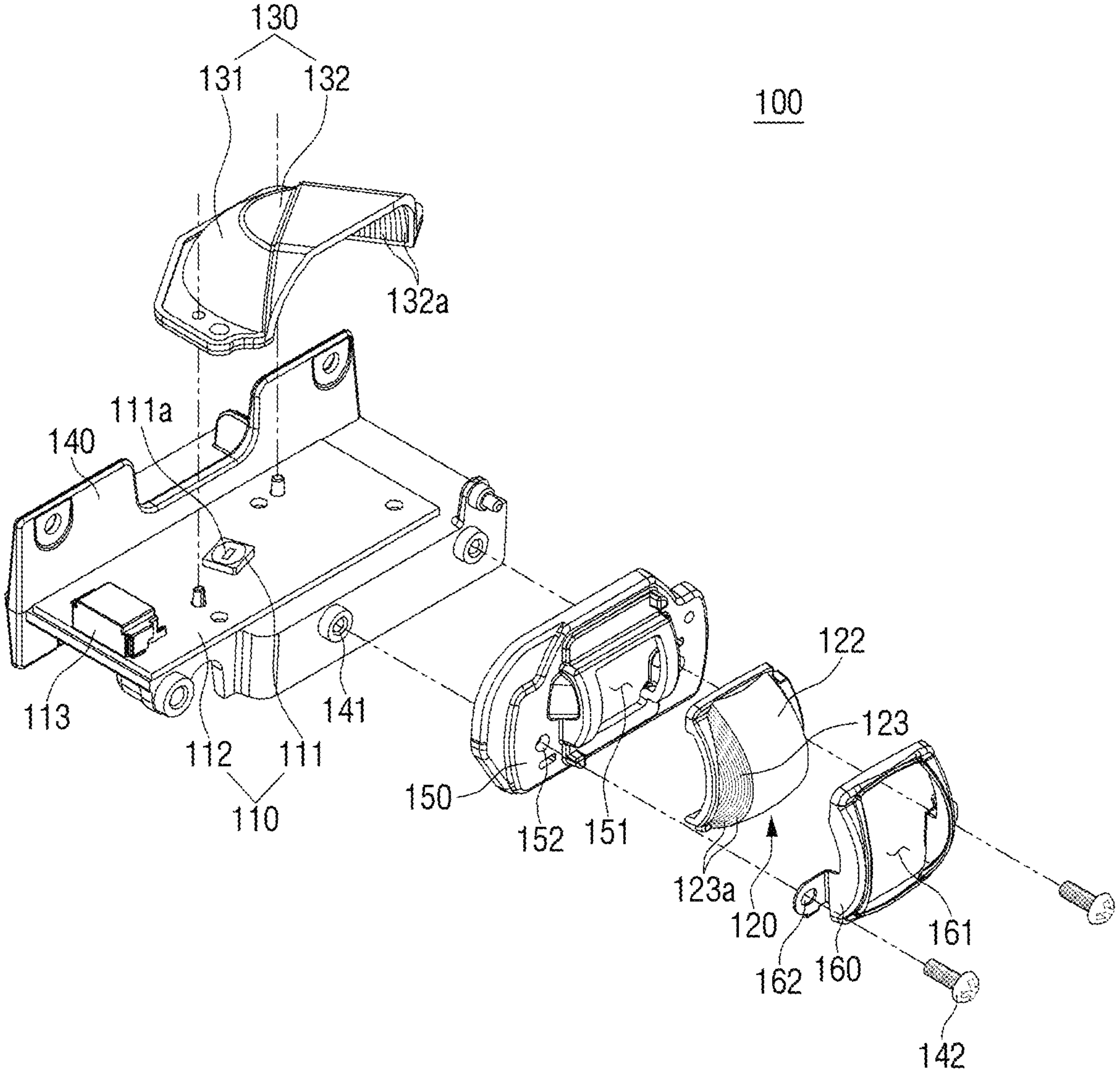
FIGS. 4 and 5 are exploded perspective views of the lamp module according to an embodiment of the present disclosure.
Figure 5:
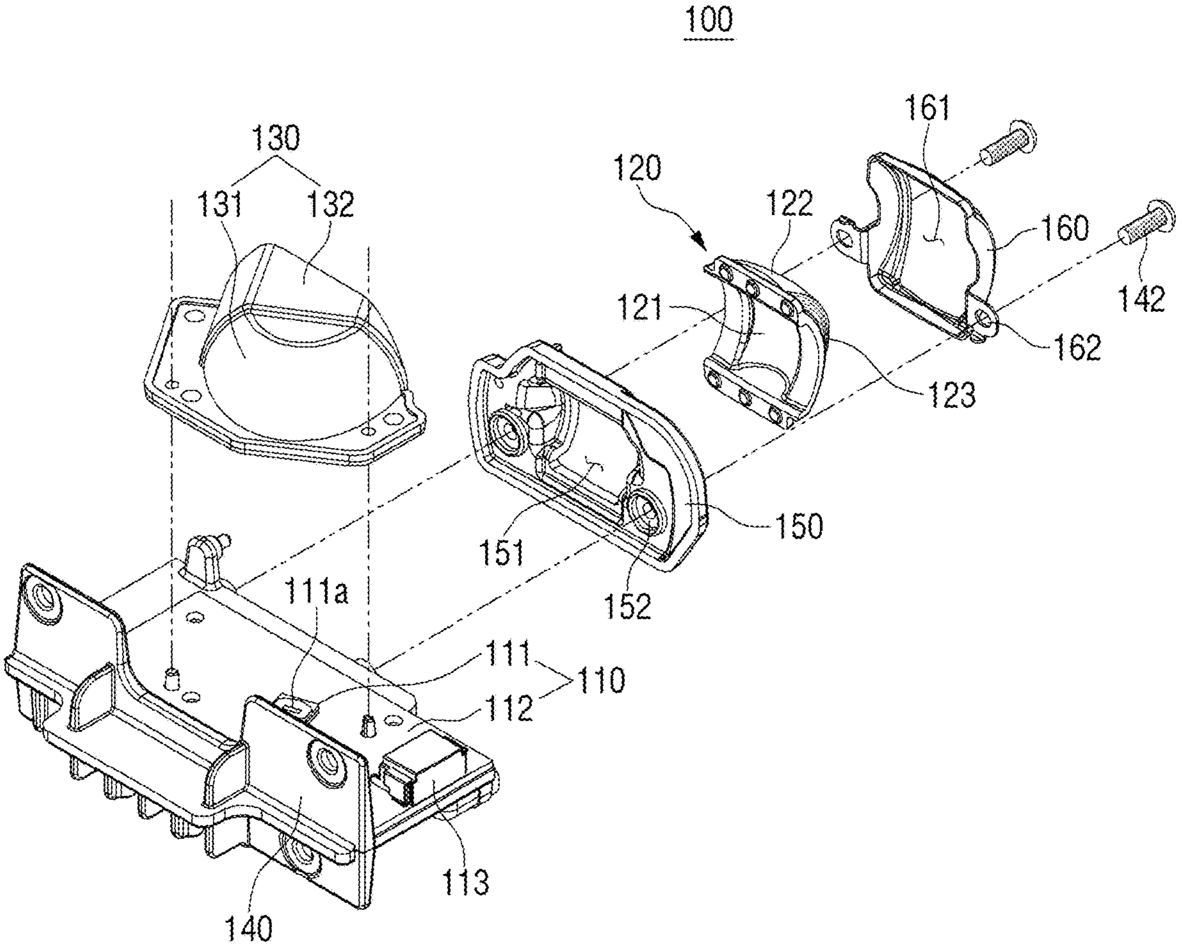

FIG. 1 is a perspective view of a lamp module according to an embodiment of the present disclosure, FIG. 2 is a front view of the lamp module according to an embodiment of the present disclosure, FIG. 3 is a plan view of the lamp module according to an embodiment of the present disclosure, and FIGS. 4 and 5 are exploded perspective views of the lamp module according to an embodiment of the present disclosure.

Referring to FIGS. 1 through 5, a lamp module 100 may include a light source unit 110, an optical unit 120, and a reflection unit 130.

The lamp module 100 will hereinafter be described for an example of a cornering lamp for securing a driver's field of vision by irradiating light to sides with respect to the front of the vehicle when the vehicle enters a curved road or changes its path by turning left or right at an intersection, but the present disclosure is not limited thereto. For example, the lamp module 100 may be used not only as a cornering lamp, but also as various other lamps installed in a vehicle, such as a head lamp, a tail lamp, a daytime running light, a brake lamp, a turn signal lamp, a backup lamp, a signal lamp, and the like.

The light source unit 110 may include a light source chip 111, which includes at least one light source that generates an appropriate amount of light with an appropriate color for a beam pattern to be formed by the lamp module 100. A light-emitting surface 111*a* of the light source chip 111 may be formed by a light-emitting surface of the light source and may have a rectangular shape, but the present disclosure is not limited thereto. The shape of the light-emitting surface 111*a* of the light source chip 111 may vary. When the light-emitting surface 111*a* is formed in a rectangular shape, a central line of the light source ship 111 may be defined as a line that passes a center of the rectangular shape and extends in parallel with two opposing sides of the rectangular shape.

The light source unit 110 will hereinafter be described as using a semiconductor light-emitting element such as a light-emitting diode (LED) as the light source, but the present disclosure is not limited thereto. The light source of the light source unit 110 may use various types of light sources other than an LED, such as a laser diode (LD) or a bulb.

The light source chip 111 may be installed on a substrate 112 at a location where it can be in thermal contact with a heat dissipation unit 140, and not only the light source chip 111, but also various parts or elements such as those for supplying power to the light source chip 111 or controlling the operation of the light source chip 111, a connector 113, and the like may be installed on the substrate 112.

The light source unit 110 may be in thermal contact with the heat dissipation unit 140 to facilitate release of heat that is generated by the light source chip 111, in consideration that heat may be generated when the light source chip 111 produces light and that the light emission performance of the light source chip 111 may undesirably deteriorate due to the heat. If necessary, additional heat dissipation devices such as a cooling fan may be used together with the heat dissipation unit 140.

The optical unit 120 may form a beam pattern appropriate for the purpose of the lamp module 100, by transmitting the light generated by the light source chip 111 therethrough. An optical axis Ax of the optical unit 120 may be disposed parallel to, for example, a front-to-rear direction of the vehicle, in order for the lamp module 100 of FIGS. 1 through 5 to create a unified appearance with other lamp modules 100 that generate a different beam pattern than the lamp module 100 of FIGS. 1 through 5, and this will be described in detail later below.

Figure 6:
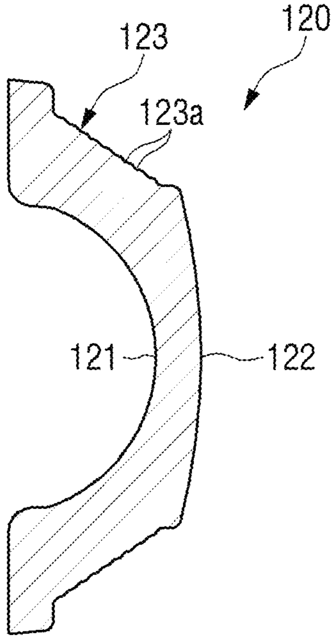
FIG. 6 is a cross-sectional view of an optical unit of the lamp module according to an embodiment of the present disclosure.

The lamp module 100 may be used as, for example, a cornering lamp. To this end, as illustrated in FIG. 6, a light-incident surface 121 of the optical unit 120 may be configured as a concave surface such that light incident upon the light-incident surface 121 may be refracted laterally by a relatively large angle, and the curvature of the light-incident surface 121 may vary depending on a required refraction angle from the optical unit 120. In some embodiments, a light-emitting surface 122 of the optical unit 120 may be configured as a convex surface to satisfy the required refraction angle.

As the light-emitting surface 122 may be more readily visible from the outside, and thus it may be more difficult to significantly modify the curvature of the light-emitting surface 122 to form a required image without affecting the exterior appearance, it may be more effective to adjust the curvature of the light-incident surface 121 than to adjust the curvature of the light-emitting surface 122. Thus, the light-incident surface 121 may be formed to have a greater curvature than the light-emitting surface 122.

The reflection unit 130 may reflect the light generated by the light source chip 111 and may thus allow the light to proceed toward the optical unit 120. Accordingly, the light-emitting surface 111*a* of the light source chip 111 may be disposed to face upward and to emit the light in an upward direction, and the reflection unit 130 may reflect the light generated by the light source chip 111 such that the light may proceed toward the optical unit 120, which is at the front of the light source chip 111.

The light source chip 111 may be disposed laterally apart from the optical axis Ax of the optical unit 120 when viewed from above as in FIG. 3, and thus, the reflection unit 130 may be configured such that a central axis C thereof is tilted by a predetermined angle with respect to the optical axis Ax of the optical unit 120.

In other words, the light source chip 111 may be disposed at a first focal point F1 of the reflection unit 130, and the reflection unit 130 may be formed such that both sides of the reflection unit 130 are substantially symmetrical with respect to the central axis C of the reflection unit 130 to focus the light reflected by the reflection unit 130 at a second focal point F2. In some embodiments, the second focal point F2 may be disposed on the optical axis Ax of the optical unit 120. More particularly, the second focal point F2 may be disposed between a front end of the optical unit 120 and a rear end of the optical unit 120 along the optical axis Ax.

In a case where the center of the light source chip 111, i.e., the center of the light-emitting surface 111*a*, is disposed at the optical axis Ax of the optical unit 120, the optical axis Ax of the optical unit 120 and the central axis C of the reflection unit 130 may coincide with each other, and thus, both sides of the reflection unit 130 may be substantially symmetrical with respect to the optical axis Ax of the optical unit 120. However, as the light source chip 111 is spaced apart laterally from the optical axis Ax of the optical unit 120 by a predetermined distance, the central axis C of the reflection unit 130 may be tilted at a predetermined angle with respect to the optical axis Ax of the optical unit 120.

Figure 7:
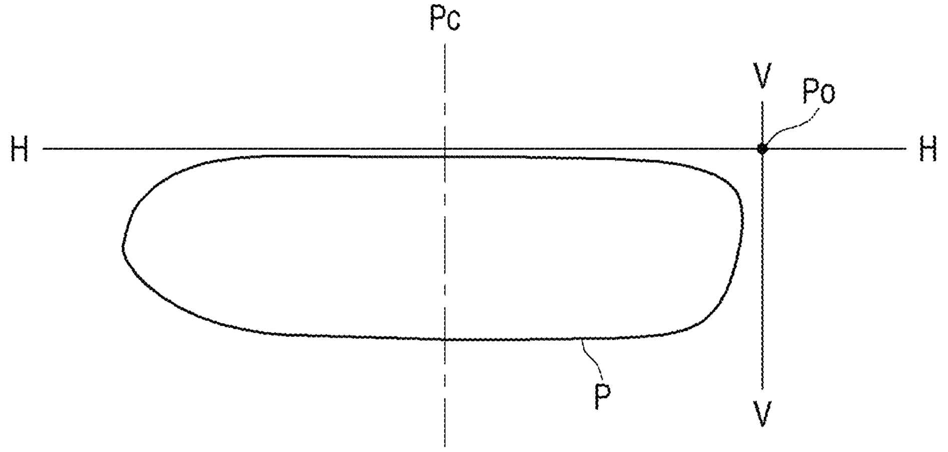
FIG. 7 illustrates a beam pattern formed by the lamp module according to an embodiment of the present disclosure.

Due to the light source chip 111 being spaced apart by a predetermined distance laterally from the optical axis Ax of the optical unit 120, the lamp module 100 may be used as a cornering lamp because, as illustrated in FIG. 7, a center Pc of a beam pattern P formed by the lamp module 100 may be moved away from the center of the front of the vehicle, i.e., an intersection Po between lines H-H and V-V. In other words, the tilting angle of the central axis C of the reflection unit 130 to make the light generated by the light source chip 111 to be incident upon the optical unit 120 may be varied depending on the distance of the light source chip 111 from the optical axis Ax of the optical unit 120, and the location of the center Pc of the beam pattern P may be varied depending on the distance of the light source chip 111 from the optical axis Ax of the optical unit 120 and the tilting angle of the central axis C of the reflection unit 130.

Referring to FIG. 7, an upper boundary of the beam pattern P may be disposed below the line H-H, and the beam pattern P may be formed by irradiating the light below the upper boundary of the beam pattern P, in consideration that glare may be caused to the driver of a preceding or oncoming vehicle when the upper boundary of the beam pattern P is disposed above the line H-H.

The reflection unit 130 may include a first reflective surface 131, which is curved, and a second reflective surface 132, which is formed at the front end of the first reflective surface 131. The first reflective surface 131 may substantially perform the function of forming a beam pattern appropriate for the purpose of the vehicular lamp, and a knurled structure 132*a* (e.g., a roughened surface; see, e.g., FIG. 4) may be formed on the inside of the second reflective surface 132 to prevent the glare of each beam pattern from occurring.

The light reflected by the reflection unit 130 may be guided by a guide opening 151 of a light guide unit 150, which serves as a bezel, coupled to the front of the heat dissipation unit 140, and may thus be transmitted to the optical unit 120. Further, a holder 160 for fixing the position of the optical unit 120 may be coupled to the light guide unit 150.

Through holes or slots 152 and 162 may be formed in the light guide unit 150 and in the holder 160, respectively, such that coupling members 142, such as screws, may pass therethrough and be coupled to coupling grooves 141 formed at the front of the heat dissipation unit 140. Accordingly, the light guide unit 150 and the holder 160 may be coupled to the heat dissipation unit 140.

An opening 161, which exposes the light-emitting surface 122 of the optical unit 120, may be formed in the holder 160, and not only the light-emitting surface 122, but also at least parts of lateral surfaces 123 between the light-incident surface 121 and the light-emitting surface 122 of the optical unit 120 may be exposed for the lamp module 100 to allow each beam pattern to have appropriate light-distribution characteristics.

Figure 8:
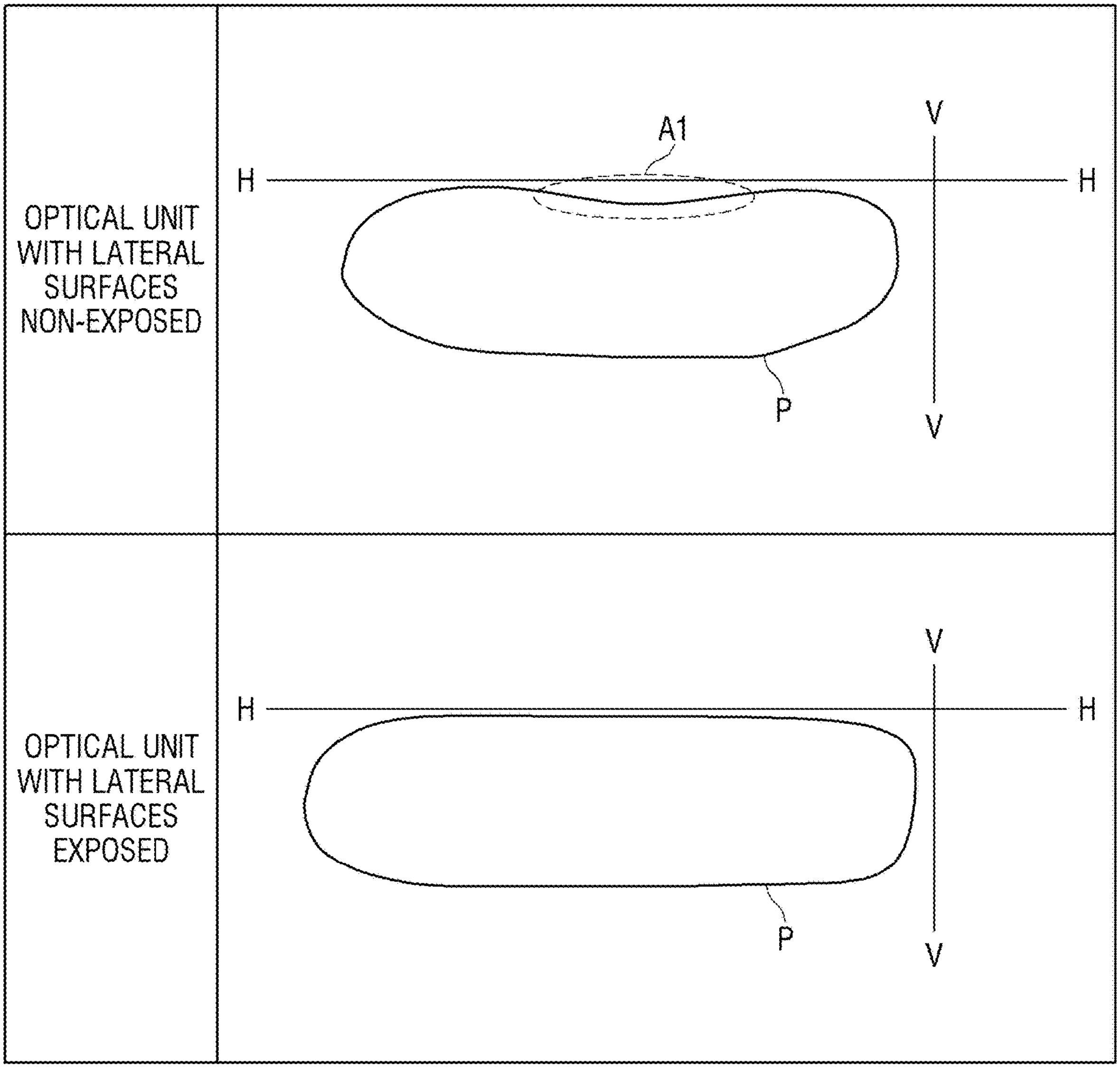
FIG. 8 illustrates beam patterns formed by the lamp module according to an embodiment of the present disclosure depending on whether lateral surfaces of the optical unit are exposed.

In other words, referring to FIG. 8, in a case where the lateral surfaces 123 of the optical unit 120 are covered by the holder 160, an area A1, at which the middle of the upper boundary of the beam pattern P slightly sags, may be generated and may deteriorate the field of vision of the driver. Thus, the lateral surfaces 123 of the optical unit 123 may be exposed to prevent the degradation of the field of vision of the driver.

One or more optical patterns 123*a* may be formed on at least parts of the lateral surfaces 123 of the optical unit 120 to diffuse or scatter the light. The optical patterns 123*a* may prevent glare that may be caused by the light emitted from the lateral surfaces 123 of the optical unit 120 and may improve the spread characteristics of the beam pattern P. A plurality of optical patterns 123*a* may be formed at regular intervals, along a diagonal direction, which is tilted at a predetermined angle with respect to the optical axis Ax of the optical unit 120. For example, the optical patterns 123*a* may be formed along the diagonal direction and may thus be disposed more rearward as the lateral distance from the optical axis Ax of the optical unit 120 increases. As a result, the light may be further spread by the optical patterns 123*a*, and the spread characteristics of the beam pattern P may be improved. The optical patterns 123*a* may be formed along a diagonal direction at a predetermined angle with respect to the optical axis Ax of the optical unit 120, but the present disclosure is not limited thereto. The optical patterns 123*a* may generally have a diagonal profile, but may be formed along a straight line, a curve, or a combination thereof.

Figure 9:
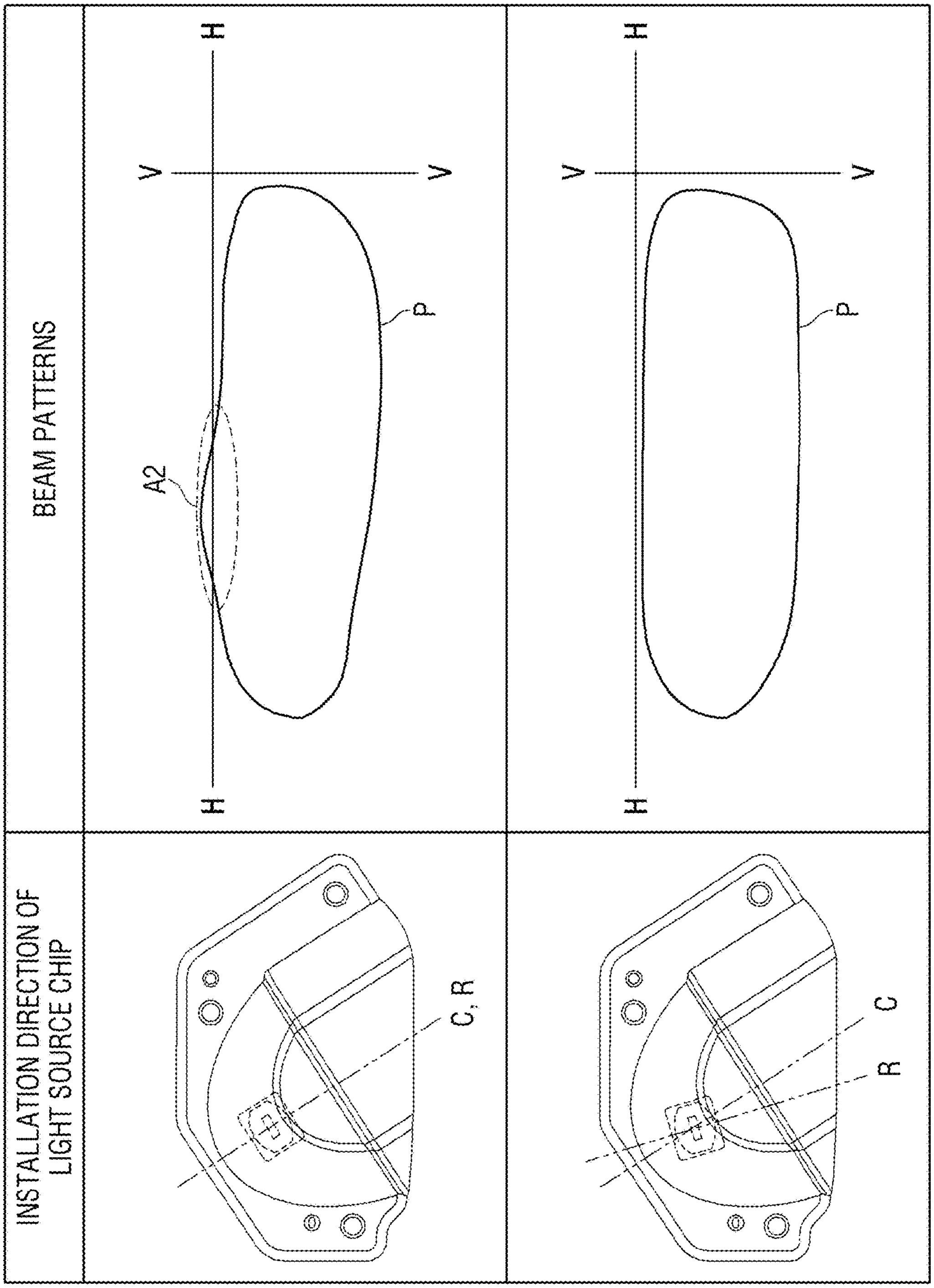
FIG. 9 illustrates beam patterns for different angles between the center line of a light source chip and a reflection unit of the lamp module according to an embodiment of the present disclosure.

Referring to FIG. 9, in an embodiment, the light source chip 111 may generally be installed such that a central line R that connects the centers of both sides faced by the light-emitting surface 111*a* may coincide with the central axis C of the reflection unit 130. In this case, however, an area A2 where part of the upper boundary of the beam pattern P protrudes upwardly may be generated, and glare may be caused to the driver of a preceding vehicle. Thus, according to the embodiment of FIGS. 1 through 5, the light source chip 111 may be disposed such that the central line R and the central axis C of the reflection unit 130 are tilted by different angles with respect to the optical axis Ax of the optical unit 120.

As discussed above, the lamp module 100 may allow the light-distribution characteristics of each beam pattern formed by the lamp module 100, i.e., the location, the shape, and the size of each beam pattern, to vary depending on the distance of the light source chip 111 from the optical axis Ax of the optical unit 120, the tilting angle of the central line R of the light-emitting surface 111*a* of the light source chip 111, the tilting angle of the central axis C of the reflection unit 130, and the curvature of at least one of the light-incident surface 121 or the light-emitting surface 122 of the optical unit 120.

Figure 10:
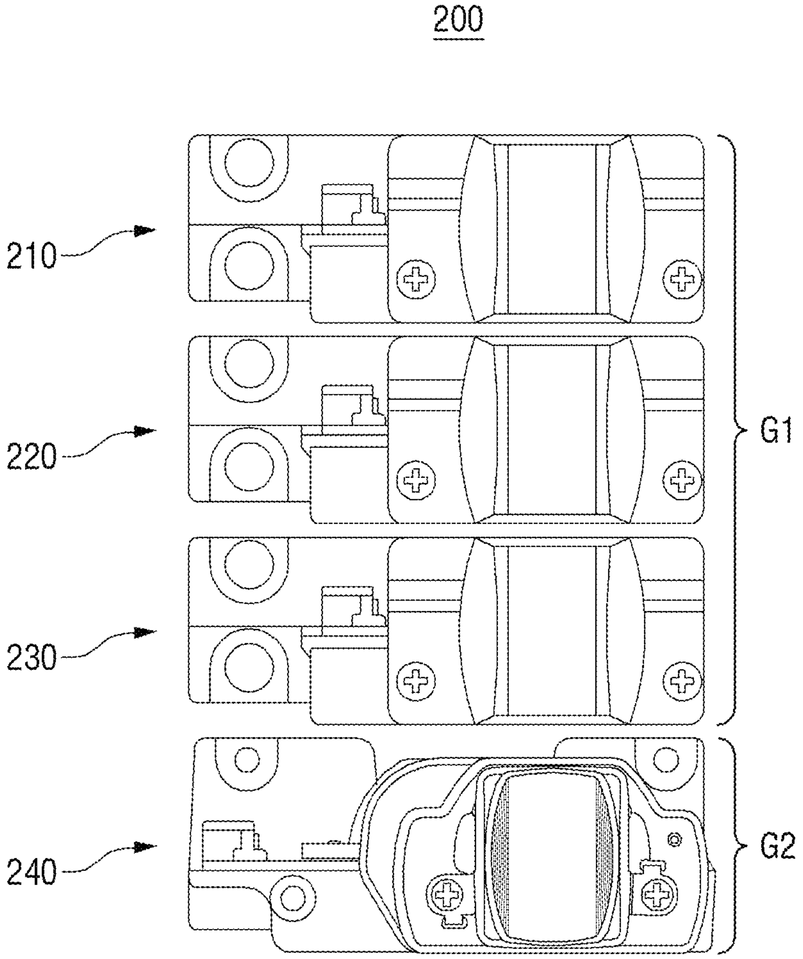
FIG. 10 is a front view of a vehicular lamp according to an embodiment of the present disclosure.

FIG. 10 is a front view of a vehicular lamp according to an embodiment of the present disclosure. Referring to FIG. 10, a vehicular lamp 200 may include a plurality of lamp modules 210, 220, 230, and 240, which are arranged in at least one direction, and at least some of the lamp modules 210, 220, 230, and 240 may form different beam patterns. The lamp modules 210, 220, 230, and 240 may be arranged along, for example, a vertical direction, but the present disclosure is not limited thereto. The lamp modules 210, 220, 230, and 240 may be arranged along a horizontal direction, the vertical direction as shown in FIG. 10, or a combination thereof.

The lamp modules 210, 220, 230, and 240 may be divided into a plurality of groups, and the groups may include, for example, a first group G1, which performs a function as a head lamp, and a second group G2, which performs a function as a cornering lamp. The first group G1 may form, for example, a low beam pattern. However, the present disclosure is not limited to this. The numbers of lamp modules and groups of lamp modules in the vehicular lamp 200 may vary depending on the type and the number of beam patterns to be formed by the vehicular lamp 200.

The lamp module 240, which is included in the second group G2, may be used as a cornering lamp, as described with regard to the lamp module 100 of FIGS. 1 through 5, and thus, a detailed description thereof will be omitted.

The first group G1, unlike the second group G2, may be used as a head lamp. A low beam pattern may be formed by varying the tilting angles of the central line R (see FIG. 3) of a light source chip 111, and the central axis C (see FIG. 3) of a reflection unit 130 with respect to the optical axis Ax (see FIG. 3) of an optical unit 120, between the lamp modules included in the first group G1.

Figure 11:
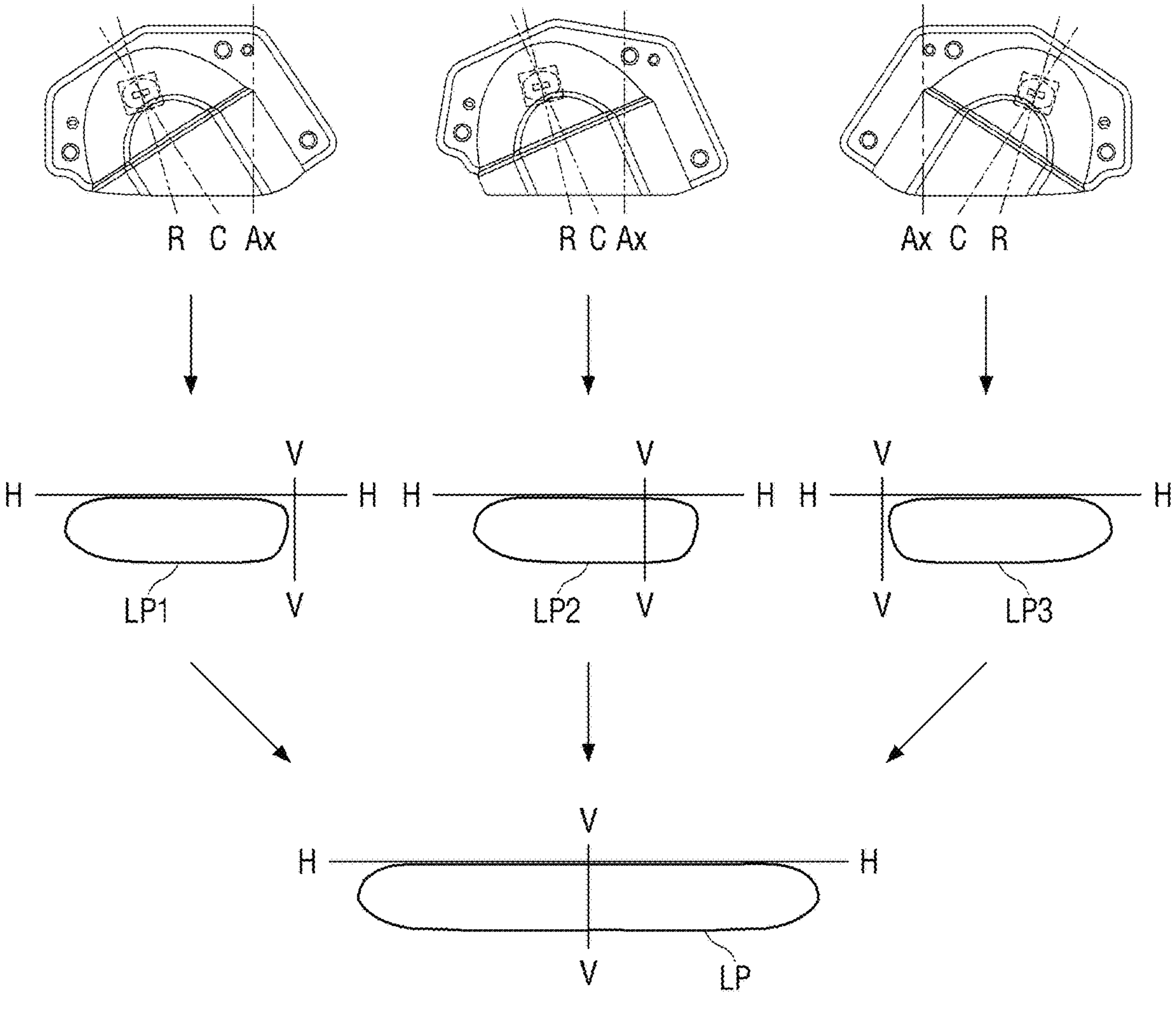
FIG. 11 illustrates beam patterns formed by the vehicular lamp according to an embodiment of the present disclosure.

For example, referring to FIG. 11, sub-beam patterns LP1, LP2, and LP3 may be formed by varying the distances of the light source chip 111 from the optical axis Ax of the light source unit 110 and varying the tilting angles of the central line R of the light source chip 111 and the central axis C of the reflection unit 130 with respect to the optical axis Ax of the optical unit 120, between the lamp modules 210, 220, and 230. A low beam pattern LP may be collectively formed by combining the sub-beam patterns LP1, LP2, and LP3.

FIG. 11 illustrates that the sub-beam patterns LP1, LP2, and LP3 may be formed at different locations by the lamp modules 210, 220, and 230, respectively, of the first group G1, by varying the direction and the distance of the light source chip from the optical axis Ax of the optical unit 120 and the tilting angles of the central line R of the light source chip 111 and the central axis C of the reflection unit 130 with respect to the optical axis Ax of the optical unit 120, between the lamp modules 210, 220, and 230. However, the present disclosure is not limited thereto. The light-distribution characteristics of the sub-beam patterns LP1, LP2, and LP3, which are formed by the lamp modules 210, 220, and 230, respectively, of the first group G1, may be diversified by varying the curvature of at least one of a light-incident surface or a light-emitting surface of the optical unit, between the lamp modules 210, 220, and 230.

FIG. 10 illustrates an example in which the lateral surfaces of the optical module of the lamp module 240 of the second group G2 are exposed, but the lateral surfaces of each of the optical modules of the lamp modules 210, 220, and 230 of the first group G1 are not exposed (i.e., covered or blocked). However, the present disclosure is not limited thereto. The lateral surfaces of each of the optical modules of the lamp modules 210, 220, and 230 of the first group G1 may be exposed depending on the type of beam pattern to be formed by the first group G1. For example, the lateral surfaces of the optical unit of one of the lamp modules 210, 220, and 230 of the first group G1 may also be exposed if the corresponding lamp module is used as a cornering lamp like the second group G2.

In the vehicular lamp according to embodiments of the present disclosure, the optical axes of the optical units of the lamp modules may be positioned in parallel to one another. Thus, even if some of the lamp modules form a different beam pattern from the rest of the lamp modules, the lamp modules may provide a more unified appearance as a whole because the optical axes of the optical units of the lamp modules do not need to be changed, and as a result, any sense of heterogeneity that may arise when the optical axes of the optical units of the lamp modules differ from one another may be reduced. Accordingly, the aesthetics of the vehicular lamp can be improved.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A lamp module comprising:

a light source unit that generates light;

an optical unit that forms a predetermined beam pattern by transmitting the light generated by the light source unit therethrough; and a reflection unit that reflects the light generated by the light source unit to be incident upon the optical unit, wherein the light source unit includes a light source chip, which is spaced apart laterally from an optical axis of the optical unit, and wherein the light source chip is disposed to allow a central line that passes through middle of both sides of a light-emitting surface formed by the light source chip to be tilted with respect to the optical axis of the optical unit by an angle that is different from an angle that a central axis of the reflection unit forms with respect to the optical axis of the optical unit.

2. The lamp module of claim 1, wherein the central axis of the reflection unit is tilted at a predetermined angle with respect to the optical axis of the optical unit to allow the light generated by the light source chip to proceed toward the optical unit.

3. The lamp module of claim 1, wherein the reflection unit includes a first reflective surface, which is curved, and a second reflective surface, which is formed at a front end of the first reflective surface, and wherein a knurled structure is formed on at least part of an inner side of the second reflective surface that is reached by the light generated by the light source unit.

4. The lamp module of claim 1, wherein a light-incident surface of the optical unit is formed in a concave shape.

5. The lamp module of claim 1, wherein a light-emitting surface of the optical unit is formed in a convex shape and has a greater curvature than a light-incident surface of the optical unit.

6. The lamp module of claim 1, wherein at least one optical pattern is formed on at least parts of lateral surfaces that are formed between a light-incident surface and a light-emitting surface of the optical unit, for diffusing or scattering the light.

7. The lamp module of claim 6, wherein a plurality of optical patterns are formed at regular intervals, along a diagonal direction having a predetermined angle with respect to the optical axis of the optical unit.

8. The lamp module of claim 1, further comprising:

a holder coupled to a heat dissipation unit on which the light source unit is disposed, to fix a position of the optical unit, wherein the holder includes an opening, which exposes a light-emitting surface of the optical unit and lateral surfaces of the optical unit, the lateral surfaces being formed between a light-incident surface and the light-emitting surface of the optical unit.

9. A vehicle lamp to form at least one beam pattern using a plurality of lamp modules, wherein at least one of the plurality of lamp modules comprises:

a light source unit that generates light;

an optical unit that transmits the light generated by the light source unit therethrough; and a reflection unit that reflects the light generated by the light source unit to be incident upon the optical unit, wherein the light source unit includes a light source chip, which is spaced apart laterally from an optical axis of the optical unit, wherein a central axis of the reflection unit is tilted at a predetermined angle with respect to the optical axis of the optical unit to allow the light generated by the light source chip to proceed toward the optical unit, wherein the optical unit includes lateral surfaces formed on both lateral sides thereof between a light-incident surface and a light-emitting surface of the optical unit, with edges dividing the light-emitting surface and the lateral surfaces, and wherein at least one optical pattern is formed on at least parts of the lateral surfaces for diffusing or scattering the light.

10. The vehicular lamp of claim 9, wherein optical axes of optical units included in the plurality of lamp modules are parallel to one another.

11. The vehicular lamp of claim 9, wherein at least one of the plurality of lamp modules differs from at least one other of the plurality of lamp modules in terms of a distance by which the light source chip is spaced apart from the optical axis of the optical unit.

12. The vehicular lamp of claim 9, wherein at least one of the plurality of lamp modules differs from at least one other of the plurality of lamp modules in terms of an angle at which the central axis of the reflection unit is tilted with respect to the optical axis of the optical unit.

13. The vehicular lamp of claim 9, wherein a central line that passes through a center between both sides of a light-emitting surface of the light source chip in at least one of the plurality of lamp modules is tilted at a different angle with respect to the optical axis of the optical unit from a central line that passes through a center between both sides of a light emitting surface of the light source chip in at least one other of the plurality of lamp modules.

14. The vehicular lamp of claim 9, wherein the optical unit includes the light-incident surface, upon which the light reflected by the reflection unit is incident, and the light-emitting surface, which emits the light incident upon the light-incident surface, and wherein at least one of the plurality of lamp modules differs from at least one other of the plurality of lamp modules in terms of a curvature of at least one of the light-incident surface or the light-emitting surface.

15. The vehicular lamp of claim 9, wherein each of the plurality of lamp modules further includes a holder coupled to a heat dissipation unit on which the light source unit is disposed, to fix a position of the optical unit, wherein the holder includes an opening, wherein, in at least one of the plurality of lamp modules, the opening exposes the light-emitting surface of the optical unit and the lateral surfaces, and wherein, in at least one other of the plurality of lamp modules, the opening exposes the light-emitting surface of the optical unit and the holder covers the lateral surfaces of the optical unit.

16. The lamp module of claim 9, wherein a plurality of optical patterns are formed at regular intervals, along a diagonal direction having a predetermined angle with respect to the optical axis of the optical unit.

* * * * *